Sept. 29, 1925. 1,555,432
A. OLIER
APPARATUS FOR EXTRACTING SUGAR FROM RAW MATERIALS
Filed Nov. 27, 1923   2 Sheets-Sheet 1

INVENTOR.
ANDRÉ OLIER.
BY:
*Francis E. Boyce*
ATTORNEY

Sept. 29, 1925.

A. OLIER 1,555,432

APPARATUS FOR EXTRACTING SUGAR FROM RAW MATERIALS

Filed Nov. 27, 1923    2 Sheets-Sheet 2

INVENTOR
ANDRÉ OLIER
BY Francis E. Boyce
ATTORNEY

Patented Sept. 29, 1925.

1,555,432

UNITED STATES PATENT OFFICE.

ANDRÉ OLIER, OF CLERMONT-FERRAND, FRANCE, ASSIGNOR TO SOCIETE ANONYME DES ETABLISSEMENTS A. OLIER, OF CLERMONT-FERRAND, FRANCE.

APPARATUS FOR EXTRACTING SUGAR FROM RAW MATERIALS.

Application filed November 27, 1923. Serial No. 677,231.

*To all whom it may concern:*

Be it known that I, ANDRÉ OLIER, citizen of the French Republic, residing at Clermont-Ferrand, Puy-de-Dome, in the Republic of France, have invented new and useful Improvements in Apparatus for Extracting Sugar from Raw Materials, of which the following is a specification.

This invention has for its object improvements in apparatus for the continuous extraction of sugar from raw materials of the type comprising a fluid tight conduit formed of adjacent vertical tubes traversed by an endless conveyor adapted to feed the material to be treated through said conduit in a direction opposite to the flow of the treating liquid.

According to the invention, the adjacent vertical tubes of the fluid tight conduit which are successively traversed by the material to be treated have progressively decreasing heights from the entrance of the liquid to the exit thereof, whereby the resistance offered to the flow of the liquid by the friction in the tubes and the reverse flow of the material is more easily overcome by said liquid.

Other characteristic features of the invention will appear from the following description, reference being had to the accompanying drawings given by way of example and in which.

Figure 1:
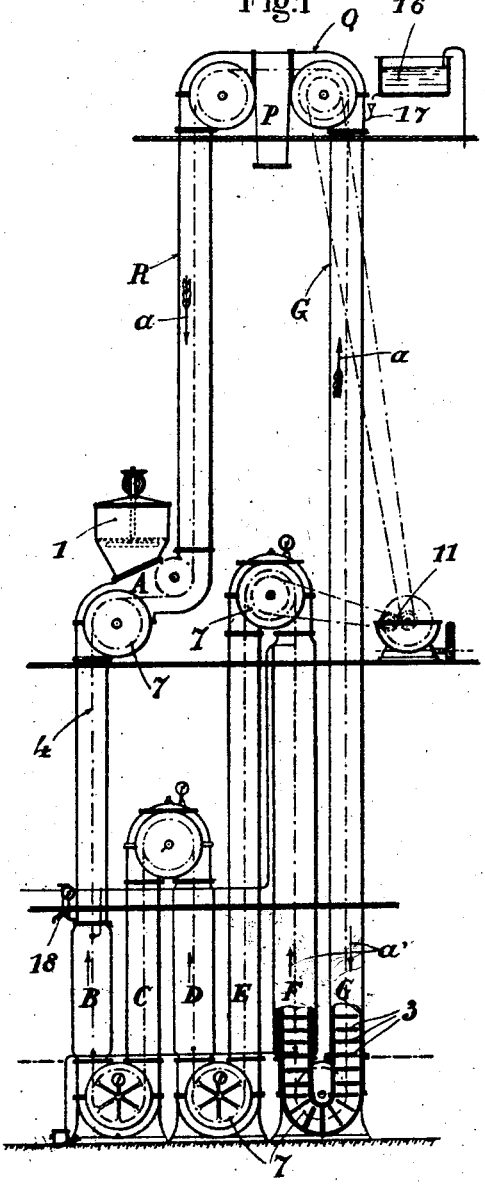
Fig. 1 is an elevational view of an embodiment of the invention.

The apparatus shown in Fig. 1 is constituted by a fluid tight conduit formed of the various tubes B, C, D, E, F, G, Q and R.

Figure 3:
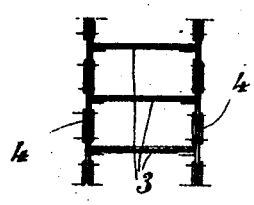
Fig. 3 is an elevational view of a portion of the endless conveyor.
Figure 4:
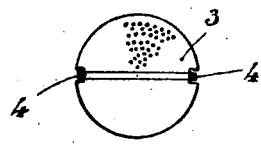
Fig. 4 shows one of the perforated discs of said conveyor.
Figure 5:
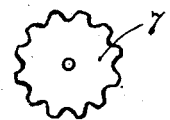
Fig. 5 is a view of a driving wheel.
Figure 6:
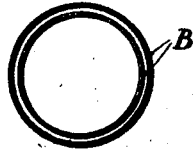
Fig. 6 is a view on a larger scale of a section of the conduit with double walls.
Figure 2:
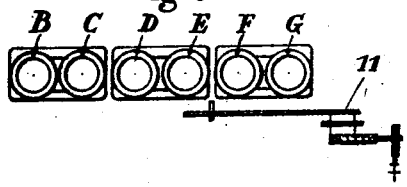
Fig. 2 is a corresponding plan view thereof.

The material to be treated, discharged from a root cutter 1, or the like, enters the fluid tight conduit at A. An endless conveyor, constituted by two calibrated chains 4 or by two cables carrying perforated plates 3, is disposed within said conduit. The conveyor is driven in the direction indicated by the arrows $a$ and drives the material to be treated. The conduit has a circular cross section and the plates 3 have a corresponding shape. The latter are preferably made of sheet metal and are secured at two diametrically opposed points to the chains or cables 4. Said chains or cables are driven by the wheels or pinions 7 (Fig. 5) placed, at each change of direction of the conveyor, in the bends connecting two adjacent vertical tubes.

It is simply necessary to actuate one of the wheels 7 or a small number of said wheels, in order to give to the chains a motion which will ensure, by means of the discs 3, the progress through the conduits B, C, D, E, F and G, of the material, from the inlet A to the outlet P.

11 indicates a speed reducing device which actuates two wheels 7 in order to provide for the movement of the conveyor.

The water or other liquid required to exhaust the sugary matter is contained in a tank 16. This water is admitted at 17, and, under the action of gravity, circulates through the conduit in the direction of the arrows $a'$, i. e. in a direction opposite to that of the circulation of the material and is discharged at 18. The water might also be supplied at the bottom of the conduit G by a suitable pump at constant pressure capable of overcoming the different resistances.

The vertical tubes constituting the conduit of the apparatus have different heights, in order to facilitate the flowing of the liquid. It may be seen, in particular, that tube G is higher than tubes E and F which themselves are higher than tubes C and D. The additional height of one pipe over the following is so calculated that the liquid can overcome the losses of pressure due to friction and to the contrary travel of the material with respect to the liquid current.

Figure 7:
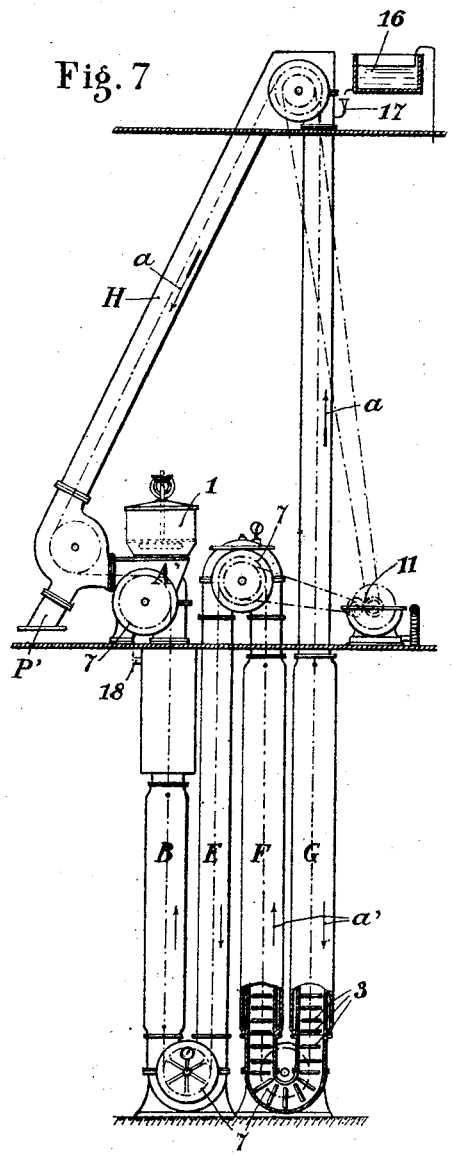
Fig. 7 is a view similar to Fig. 1 of a modified embodiment.

The modified form shown in Fig. 7 differs from that shown in Fig. 1 chiefly in that the discharge of the treated material takes place at P' at the same level as the feeding of the material to be treated at A'; under these conditions a single pulley is necessary at the top of the apparatus and it is possible to cool the material during the travel thereof through the inclined tube H.

The conduits B, D, F through which the liquid is ascending, have double walls and are heated by hot water or steam. The conduit G might also have double walls and be kept cool, either to avoid losses of calories or to avoid the softening of the material or its crushing when further treated in presses.

Having now described my invention, what I claim as new and desire to secure by Letters Patent is:

1. An apparatus for the continuous extration of sugar from raw material and for like purposes embodying a sinuous fluid-tight conduit comprising a high vertical tube, a number of lower vertical tubes and bends for connecting said tubes in series, an inlet conduit at the upper part of the high vertical tube for supplying the treating liquid, an outlet orifice for exhausting the juice at the upper part of the last lower vertical tube, means for feeding the material to be treated into the top of said last lower vertical tube, a return tube connecting the upper part of said last lower vertical tube to the high vertical tube, wheels disposed in the bends of the sinuous conduit, an endless conveyor passing over said wheels and means for actuating said conveyor.

2. An apparatus for the continuous extraction of sugar from raw material and for like purposes embodying a sinuous fluid tight conduit comprising a high vertical tube, a number of lower vertical tubes and bends for connecting said tubes in series, an inlet conduit at the upper part of the high vertical tube for supplying the treating liquid, an outlet orifice for exhausting the juice at the upper part of the last lower vertical tube, means for feeding the material to be treated into the top of said last lower vertical tube, a return tube connecting the upper part of said last lower vertical tube to the high vertical tube, wheels disposed in the bends of the sinuous conduit, an endless conveyor passing over said wheels and constituted of circular perforated plates fixed at diametrically opposite points to two calibrated chains and means for actuating said conveyor.

3. An apparatus for the continuous extraction of sugar from raw material and for like purposes embodying a sinuous fluid tight conduit comprising a high vertical tube, a number of lower vertical tubes and bends for connecting said tubes in series, an inlet conduit at the upper part of the high vertical tube for supplying the treating liquid, an outlet orifice for exhausting the juice at the upper part of the last lower vertical tube, means for feeding the material to be treated into the top of said last lower vertical tube, a return tube connecting the upper part of said last lower vertical tube to the high vertical tube, said return tube being inclined, means for discharging the treated material from the bottom of the inclined tube, wheels disposed in the bends of the sinuous conduit, an endless conveyor passing over said wheels and constituted of circular perforated plates fixed at diametrically opposite points to two calibrated chains and means for actuating said conveyor.

4. An apparatus for the continuous extraction of sugar from raw material and for like purposes embodying a sinuous fluid-tight conduit comprising a high vertical tube, a number of lower vertical tubes and bends for connecting said tubes in series, an inlet conduit at the upper part of the high vertical tube for supplying the treating liquid, an outlet orifice for exhausting the juice at the upper part of the last lower vertical tube, means for feeding the material to be treated into the top of said last lower vertical tube, a return tube connecting the upper part of said last lower vertical tube to the high vertical tube, said return tube being inclined, means for discharging the treated material from the bottom of the inclined tube, said feeding and discharging means being substantially at the same level, wheels disposed in the bends of the sinuous conduit, an endless conveyor passing over said wheels and constituted of circular perforated plates fixed at diametrically opposite points to two calibrated chains and means for actuating said conveyor.

5. An apparatus for the continuous extraction of sugar from raw material and for like purposes embodying a sinuous fluid-tight conduit comprising a high vertical tube, a number of lower vertical tubes and bends for connecting said tubes in series, the high tube being double walled for cooling purposes and the lower tubes in which the liquid is caused to rise being double walled for heating purposes, an inlet conduit at the upper part of the high vertical tube for supplying the treating liquid, an outlet orifice for exhausting the juice at the upper part of the last lower vertical tube, means for feeding the material to be treated into the top of said last lower vertical tube, a return tube connecting the upper part of said last lower vertical tube to the high vertical tube, said return tube being inclined, means for discharging the treated material from the bottom of the inclined tube, said feeding and discharging means being substantially at the same level, wheels disposed in the bends of the sinuous conduit, an endless conveyor passing over said wheels and constituted of circular perforated plates fixed at diametrically opposite points to two calibrated chains and means for actuating said conveyor.

In testimony whereof I have signed my name to this specification.

ANDRÉ OLIER.